(12) United States Patent
Harrison et al.

(10) Patent No.: US 9,219,407 B2
(45) Date of Patent: Dec. 22, 2015

(54) CYCLO-CONVERTER AND METHODS OF OPERATION

(75) Inventors: Michael John Harrison, Petaluma, CA (US); Tony Joseph Olivo, Raleigh, NC (US)

(73) Assignee: Eaton Industries Company, Christchurch (NZ)

( * ) Notice: Subject to any disclaimer, the term of this patent is extended or adjusted under 35 U.S.C. 154(b) by 653 days.

(21) Appl. No.: 13/532,205

(22) Filed: Jun. 25, 2012

(65) Prior Publication Data

US 2012/0320648 A1 Dec. 20, 2012

Related U.S. Application Data

(63) Continuation-in-part of application No. 12/375,605, filed as application No. PCT/NZ2007/000165 on Jun. 25, 2007, now Pat. No. 8,520,409.

(30) Foreign Application Priority Data

Aug. 10, 2006 (NZ) ........................................ 549103

(51) Int. Cl.
*H02M 3/335* (2006.01)
*H02M 1/42* (2007.01)

(52) U.S. Cl.
CPC .......... *H02M 1/4216* (2013.01); *H02M 1/4258* (2013.01); *Y02B 70/126* (2013.01)

(58) Field of Classification Search
CPC ............................. H02M 3/335; H02M 7/122
USPC ........ 363/16, 17, 21.02, 56.01, 56.02, 97, 98, 363/131, 132
See application file for complete search history.

(56) References Cited

U.S. PATENT DOCUMENTS

| | | | |
|---|---|---|---|
| 3,487,289 A | 12/1969 | McMurray | |
| 3,882,370 A | 5/1975 | McMurray | |
| 3,989,996 A | 11/1976 | Stacey | |
| 4,096,557 A | 6/1978 | Schwarz | |
| 4,355,351 A | 10/1982 | Schwarz | |
| 4,926,306 A | 5/1990 | Ueda et al. | |

(Continued)

FOREIGN PATENT DOCUMENTS

| | | |
|---|---|---|
| CN | 1 738 172 B | 3/2011 |
| EP | 1 708 350 A2 | 10/2006 |

(Continued)

OTHER PUBLICATIONS

Notification of Transmittal of the International Search Report and the Written Opinion of the International Searching Authority, or the Declaration, PCT/US2013/047040, Date of Mailing: Sep. 9, 2013, 14 pages.

(Continued)

*Primary Examiner* — Matthew Nguyen
(74) *Attorney, Agent, or Firm* — Myers Bigel Sibley & Sajovec, P.A.

(57) ABSTRACT

A three phase full resonant cyclo-converter suitable for converting a three phase AC supply to a DC output. In one embodiment the cyclo-converter consists of two half bridge cyclo-converters driving a resonant circuit. The main switching sequence of the cyclo-converter may consist of a switching sequence in which the phases of a three phase supply are switched in a repeating sequence from the largest to the smallest absolute voltage value of the supply phases.

16 Claims, 19 Drawing Sheets

(56) References Cited

U.S. PATENT DOCUMENTS

| | | | |
|---|---|---|---|
| 5,010,471 | A | 4/1991 | Klaassens et al. |
| 5,764,501 | A | 6/1998 | Limpaecher |
| 6,061,256 | A * | 5/2000 | Kolar .............................. 363/37 |
| 6,801,441 | B2 | 10/2004 | Salama |
| 6,937,483 | B2 * | 8/2005 | Zhu et al. ....................... 363/17 |
| 2003/0095424 | A1 | 5/2003 | Oates |
| 2005/0024023 | A1 * | 2/2005 | Chang ........................... 323/207 |
| 2012/0163035 | A1 | 6/2012 | Song et al. |

FOREIGN PATENT DOCUMENTS

| | | |
|---|---|---|
| GB | 1397604 | 6/1975 |
| JP | H04 147608 A | 5/1992 |
| WO | WO 2008/018802 A2 | 2/2008 |

OTHER PUBLICATIONS

Huisman, H.: "*A Multiphase Series-Resonant Converter with a New Topology and a Reduced Number of Thyristors*" IEEE Transactions on Power Electronics; vol. 10, No. 1, (Jan. 1995) pp. 86-93.

Norrga, S.; "*Novel Soft-switching Isolated Three-phase Bidirectional AC/DC Converter*" Proceedings of Nordic Workshop on Power and Industrial Electronics; (Aug. 2002) 6 Pages.

Borojevic et al. "*A Zero-Voltage Switched, Three-Phase PWM Switching Rectifier with Power Factor Correction*"; Proceedings of the High-Frequency Power Conversion Conference: Toronto, Canada; Jun. 9 -14, 1991; pp. 252-264.

International Search Report, PCT/NZ2007/000165; Jun. 25, 2007.

International Preliminary Report on Patentability; Sep. 22, 2008.

International Preliminary Report on Patentability, PCT/US2013/047040, Date of Mailing: Dec. 31, 2014, 10 pages.

* cited by examiner

| MAINS START ANGLE | 0 | 30 | 80 | 90 | 120 | 150 | 180 | 210 | 244 | 270 | 300 | 330 |
|---|---|---|---|---|---|---|---|---|---|---|---|---|
| MAINS FINISH ANGLE | 30 | 80 | 90 | 120 | 150 | 120 | 210 | 240 | 270 | 300 | 330 | 360 |
| SEQUENCE SEGMENT | 1 | 2 | 3 | 4 | 5 | 6 | 7 | 8 | 9 | 10 | 11 | 12 |
|  |  |  |  |  |  |  |  |  |  |  |  |  |
| YELLOW UPPER | L | L | M | S | s | m | on | on | m | s | S | M |
| YELLOW LOWER | on | on | m | s | S | M | L | L | M | S | s | m |
|  |  |  |  |  |  |  |  |  |  |  |  |  |

FIG. 5

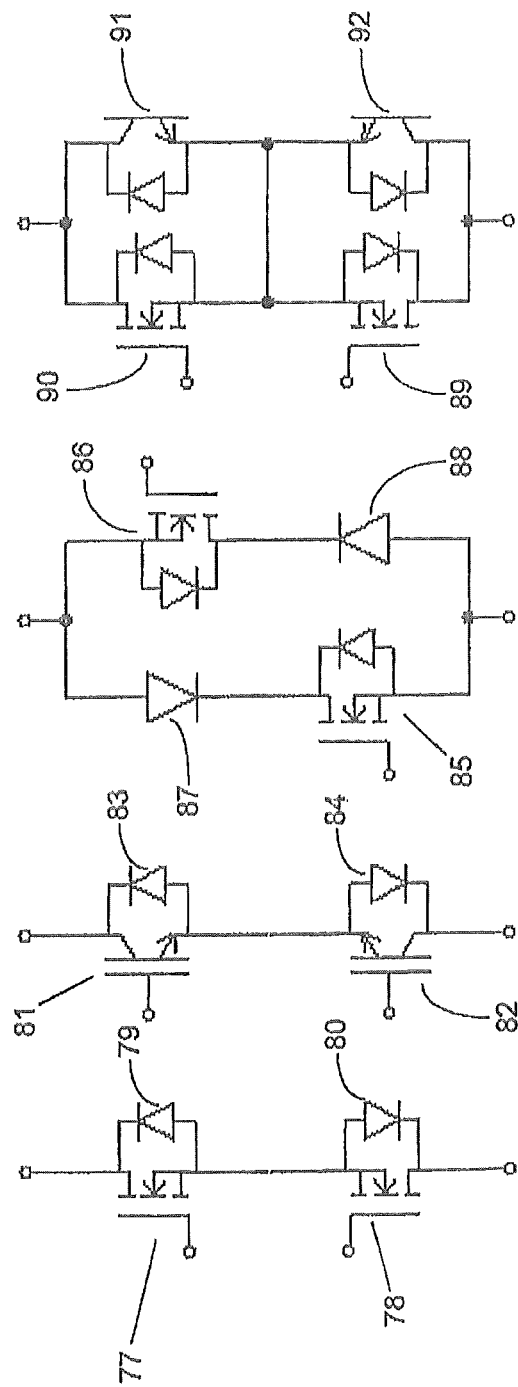

CYCLO-CONVERTER AND METHODS OF OPERATION

RELATED APPLICATIONS

This application is a continuation-in-part application and claims priority to U.S. patent application Ser. No. 12/375,605, filed Sep. 15, 2009, now U.S Pat. No. 8,520,409 which is a U.S. National Phase application of PCT/NZ2007/000165, having an international filing date of Jun. 25, 2007, claiming priority to New Zealand Patent Application No. 549103, filed Aug. 10, 2006. The disclosures of each application are incorporated herein by reference in their entireties.

FIELD OF THE INVENTION

This invention relates to a cyclo-converter and to methods of operating a cyclo-converter. More particularly, although not exclusively, the invention relates to a three phase full resonant cyclo-converter suitable for converting a three phase AC supply to a DC output. Whilst the converter of the present invention may find particular application in telecommunications power supplies it will be appreciated that it may find application in a wide range of applications.

BACKGROUND OF THE INVENTION

In applications such as telecommunications power supplies converters must meet requirements as to Total Harmonic Distortion, harmonic current limits, isolation etc. whilst also achieving high conversion efficiencies. The performance requirements for isolated AC to DC switched mode power supplies for use in telecommunications and large computer applications have to a large extent been met through the adoption of two-stage power supply designs. The first power conversion stage serves the purpose of achieving Power Factor Correction (PFC) by employing some form of PFC controlled boost converter. Small power supplies tend to use single-phase mains input whereas larger power supplies tend to adopt three-phase mains input and hence need some form of three-phase PFC boost converter (e.g. the Vienna converter). The second power conversion stage serves the purpose of voltage transformation/isolation and output voltage/current control. This second stage converter usually employs resonant switching techniques in order to maximise conversion efficiency and minimise the size and cooling requirements (hence cost) of the power supply design solution. The problem with two stage cascaded power supplies is that the total conversion losses is the sum total of the losses of each conversion stage. With each stage achieving typically 96% conversion efficiency a 92% total efficiency typically results.

The promise of high theoretical single stage efficiencies has allured many power supply designers to try to develop effective single stage AC to DC switched mode power supplies. The energy storage requirements related with single-phase converters has resulted in complex single stage designs with poor overall conversion efficiencies that lack any practical advantage over the conventional two-stage design approach.

FIG. 1 shows a prior art full bridge cyclo-converter consisting of six bidirectional switches 1 to 6 supplied via three-phase lines 7 to 9 which drives the primary 10 offer output transformer 11. Switch 1 consists of a forward MOSFET 13 in parallel with a body diode 15 in series with a reverse MOSFET 14 in parallel with body diode 16. Switches 2 and 3 are of the same configuration. A half bridge rectifier 12 is provided at the output off the transformer. The cyclo-converter is hard switched to effect PWM control. To achieve the desired voltage at the output the top and bottom switching sequences are offset the required amount. The degree of offset determines the period of time the output transformer is shorted and does the period of time that currents circulate within the cyclo-converter. This circulated current (as opposed to current transferred to the current doubler 12) incurs losses as it passes through switches 1 to 6. This approach provides an easily controlled converter as the output voltage may easily be brought down by adjusting the offset of the upper and low switching. However, this converter requires 12 switching components and the hard switching employed requires highly rated components to handle with the spikes and losses. Further, such converters typically only have a conversion efficiency of about 93% and the losses and large number of power components makes the converter physically large and expensive to produce.

The publication "A Zero-Voltage Switched, Three-Phase PWM Switching Rectifier with Power Factor Correction" from Proceedings of the High-Frequency Power Conversion Conference: Toronto, Canada; Jun. 9-14, 1991; pp. 252-264 discloses a full bridge cyclo-converter in which a switching sequence is employed utilising resonant switching in. However, the switching is simple on/off switching and the switching sequence is only partially optimised and does not provide full resonant switching.

Series resonant converters have been provided which employ full resonant switching (i.e. the switched currents are near zero at turn off and turn on to effect "soft switching" at all switching points). However, such converters include complex control circuits and can only switch DC supplies. It can also be difficult to control the output of such converters solely by controlling the switching frequency for low power output levels.

It would be desirable to provide an isolated converter operable over a wide range of input voltages having high conversion efficiency, a low power component count, low rated power components, no large inductors or storage components and low harmonic distortion It is an object of the invention to provide a converter satisfying the above requirements or to at least provide the public with a useful choice.

SUMMARY OF THE INVENTION

There is provided a cyclo-converter including a resonant circuit in which switching is determined by resonance of the resonant circuit. This may be implemented as a full resonant three phase half bridge cyclo-converter. Methods of switching the cyclo-converter to control the output of the converter and provide power factor correction are also disclosed. A number of embodiments are described and the following embodiments are to be read as non-limiting exemplary embodiments only.

According to a first aspect there is provided a three phase half bridge cyclo-converter for driving an inductive load comprising:
  i. three phase inputs
  ii. bidirectional switches between each input and a first output line;
  iii. capacitors between each input and a second output line; and
  iv. a controller controlling the switching of the bidirectional switches on the basis of the output voltage and/or input voltage.

According to a further aspect there is provided a switched-mode cyclo-converter employing resonant switching comprising:
i. a first half bridge cyclo-converter including:
 i. three phase voltage inputs;
 ii. bidirectional switches between each input and an output line; and
 iii. capacitors between each input and a common node;
ii. a second half bridge cyclo-converter including:
 i. three phase voltage inputs;
 ii. bidirectional switches between each input and an output line; and
 iii. capacitors between each input and a common node;
iii. a resonant circuit connected across the output lines of the first and second half bridge cyclo-converters; and
iv. a controller that controls the switching periods of the bidirectional switches based on the three phase voltages.

According to a further aspect there is provided a three phase half bridge cyclo-converter as claimed in any one of the preceding claims wherein the controller controls the switching frequency of the bidirectional switches in dependence upon the output of the cyclo-converter.

According to a further aspect there is provided a full resonant cyclo-converter in which the switches are four mode bidirectional switches having a conducting mode, each having a blocking diode in parallel, wherein for a given cycle the reverse switch is switched in prior to the forward switch to allow natural voltage levels to facilitate switching.

There is further provided a method of controlling the output of a full resonant cyclo-converter by controlling the switching frequency of the cyclo-converter in dependence upon the difference between a desired output and actual output.

There is further provided a method of correcting the power factor of a three phase half bridge cyclo-converter by adjusting the proportions of time each phase is switched on.

There is further provided a method of controlling the switching of a full resonant cyclo-converter by controlling the main switching sequence of phases in a repeating sequence from the largest to the smallest absolute voltage.

There is further provided a of switching a cyclo-converter including a resonant circuit at a switching frequency greater than the supply frequency wherein switching is effected so that the resonant voltage at the switching frequency is utilized to facilitate soft switching of the switches.

There is further provided a method of switching a full resonant cyclo-converter wherein the switches are bidirectional switches each consisting of a forward switch and a reverse switch, each having a blocking diode in parallel, the method comprising switching in a blocking switch to allow resonant voltages to facilitate switching of a forward switch.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

FIG. 5 illustrates the switching sequence for upper and lower switches of the cyclo-converter;
FIG. 13 shows a first switching element for use in the cyclo-converter shown in FIG. 2;
FIG. 14 shows a further switching element for use in the cyclo-converter shown in FIG. 2;
FIG. 15 shows a further switching element for use in the cyclo-converter shown in FIG. 2;
FIG. 16 shows a further switching element for use in the cyclo-converter shown in FIG. 2.

DESCRIPTION OF EMBODIMENTS OF THE INVENTION

Figure 2:
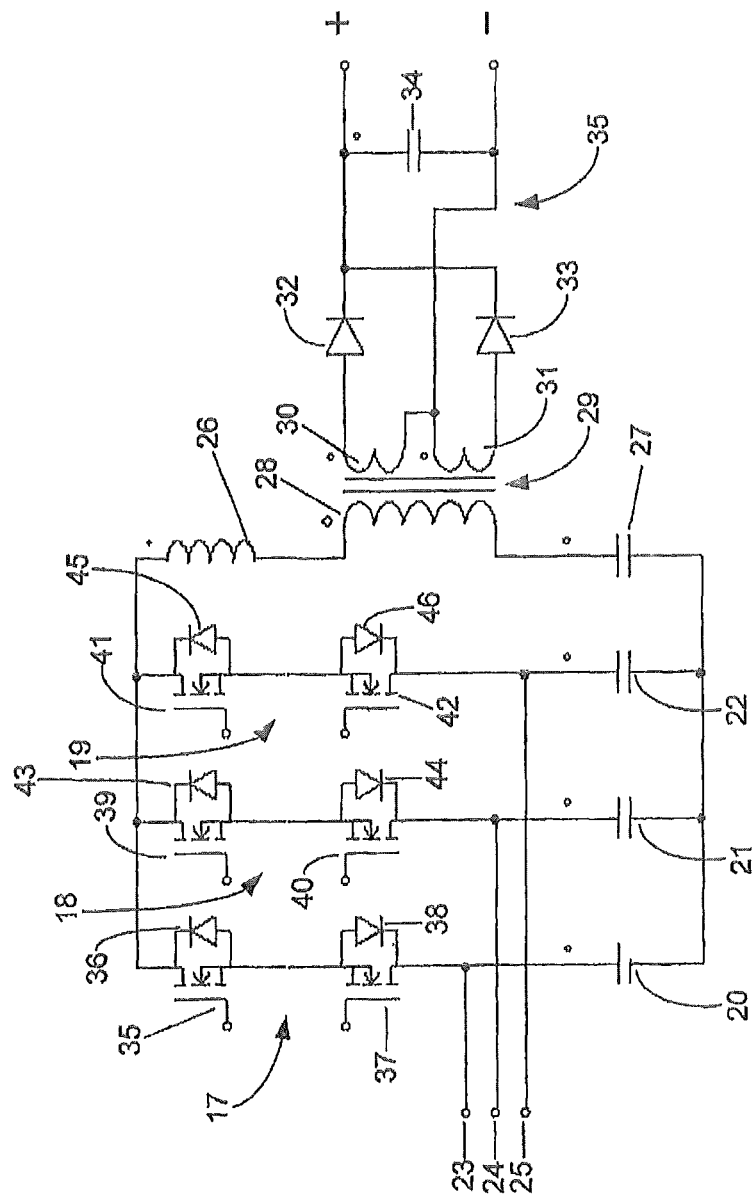
FIG. 2 shows a half bridge cyclo-converter.

FIG. 2 shows a half bridge cyclo-converter according to a first embodiment. The cyclo-converter includes bidirectional switches 17 to 19 and capacitors 20 to 22 forming the half bridge. Switch 17 consists of MOSFET 35 in parallel with body diode 36 in series with MOSFET 37 in parallel with body diode 38. Switch 17 has four states:

1. on (MOSFETs 35 and MOSFET 37 on);
2. off (MOSFET's 35 and 37 off)
3. forward diode (MOSFET 37 on switching in body diode 36)
4. reverse diode (MOSFET 35 on switching in body diode 38)

Switches 18 and 19 are similarly configured. By utilizing the four switching states full resonant switching can be achieved as will be described.

Three phase supply lines 23 to 25 provide a three phase AC supply to the half bridge. The output of the cyclo-converter drives an LLC resonant circuit consisting of inductor 26, capacitor 27 and primary coil 28 of transformer 29. Output coils 30 and 31 are connected via diodes 32 and 33 and capacitor 34 to form half bridge rectifier 35.

Figure 1:
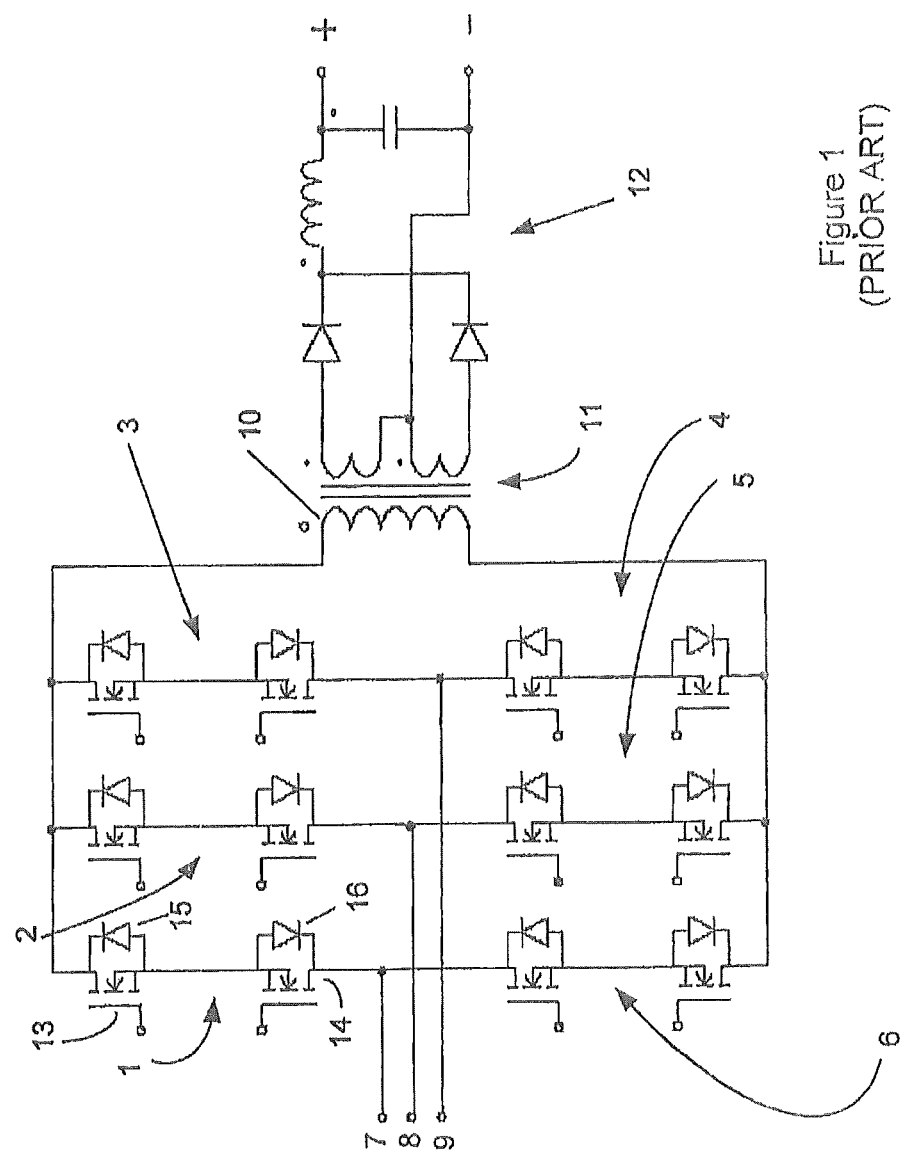
FIG. 1 shows a prior art cyclo-converter.

It will be noted that the circuit is realised with six transistors (compared to 12 for the cyclo-converter shown in FIG. 1). Capacitors 20 to 22 form the half-bridge centre point. Inductor 26 and capacitor 27 form the series-resonant circuit. To achieve low load output voltage regulation the resonant circuit can be easily transformed from a simple LC resonant circuit into an LLC resonant circuit by gapping the core of the main transformer 29. The primary method of output voltage control is achieved by variable frequency control. The use of variable frequency control to a series-resonant converter removes the need for any output inductor (as needed by the PWM controlled cyclo-converter shown in FIG. 1).

Each of the six transistors is individually controlled. The sequencing order and control of the individual transistors achieves two primary functions:

A three-voltage level, high frequency waveform is fed into the resonant load to effect a power transfer.

Transistors that are reverse biased (anti-parallel/body diode conducting) are turned on to create a voltage clamp to limit the voltage stresses incurred during switching transition periods. This clamp action limits the maximum voltage stress to any transistor equal to the peak mains phase to phase voltage.

Figure 3:
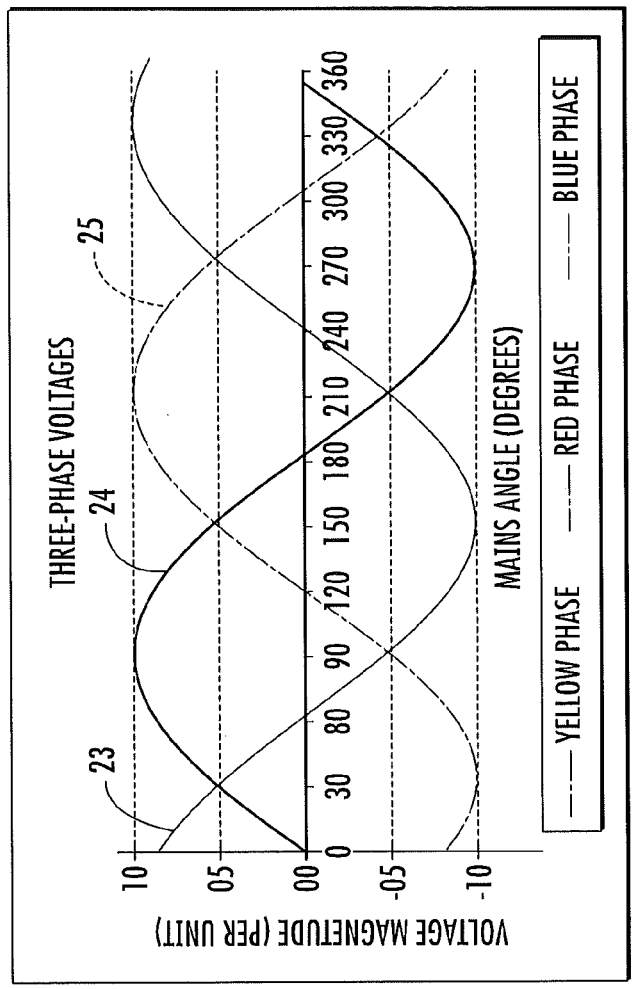
FIG. 3 shows the voltage waveforms of a three phase AC supply.
Figure 4:
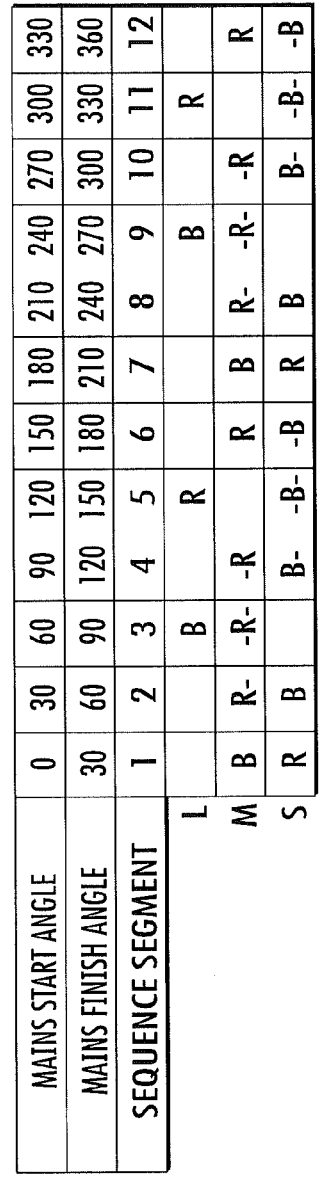
FIG. 4 illustrates the switching sequence of the cyclo-converter shown in FIG. 2.

FIGS. 3 to 5 illustrate the switching sequence employed to achieve resonant switching. FIG. 3 shows the voltage waveforms of the three phases supplied via supply lines 23 to 25 (23 being the blue phase, 24 being the red phase and 25 being the yellow phase). The voltage waveforms are divided into twelve 30° segments between zero crossings and phase magnitude crossings. To enable resonant switching the transistors may be sequenced in the order shown in FIG. 4 in which the largest absolute voltage magnitude (L) mains phase transistor is switched on first, followed by the mains phase that has the medium absolute voltage magnitude (M), then finally the mains phase with the smallest absolute mains voltage magnitude (S). This sequencing is repeated over each 30° segment (L, M, S, L, M, S, . . . ) with a sub-microsecond dead-time to allow for the resonant load voltage commutation. Since the mains instantaneous input voltages are continually changing the sequencing logic responsible for driving the individual transistors reverses the transistor sequencing order every 30 degrees of mains input. The bottom three rows of the table shown in FIG. 4 show the required switching sequence that is required to maintain the requirements to achieve resonant (soft) switching. Reading the three phase letters downwards in each column indicates the switching sequence (e.g. Yellow, Blue, Red, Yellow, Blue, Red . . . for the first sequence etc.). Each 30-degree segment the effective switching order reverses. This reversing order ensures that an "L", "M", "S", "L", "M", "S" . . . switching order is maintained.

Figure 6:
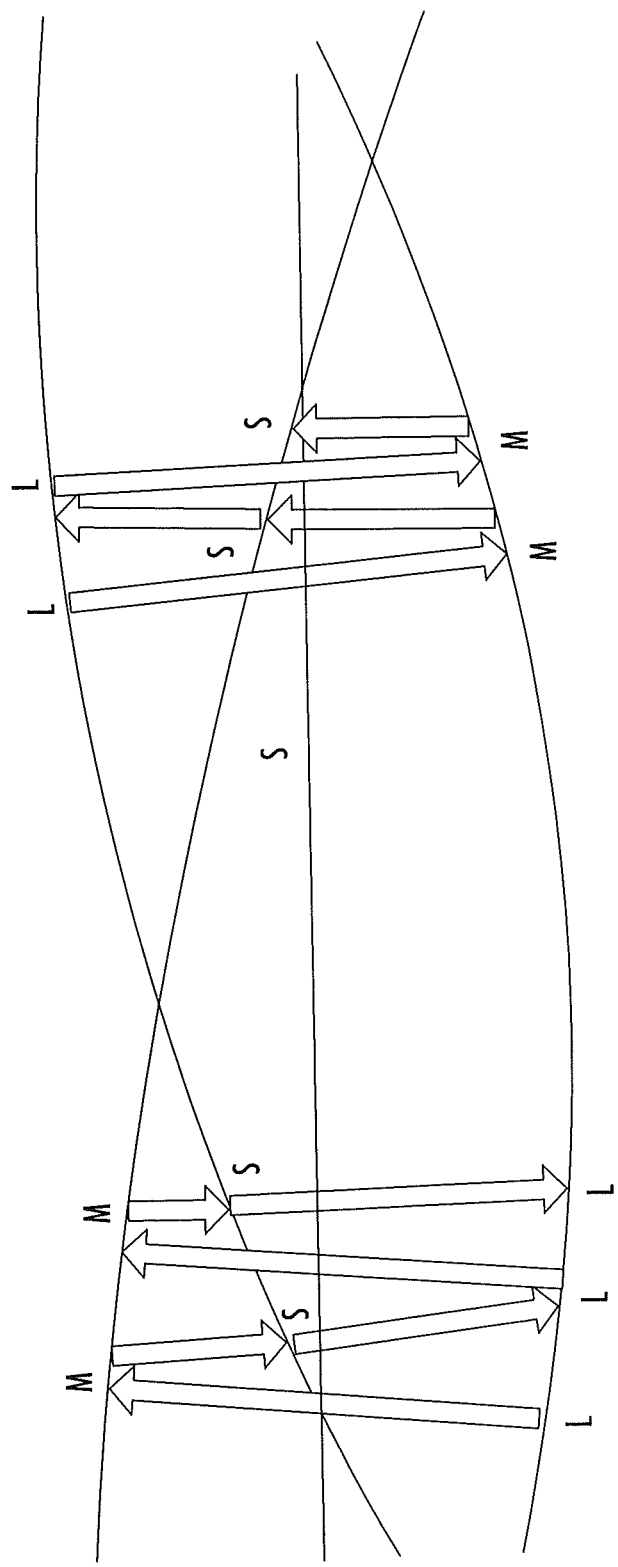
FIG. 6 illustrates the switching sequence in a three phase waveform.
Figure 7:
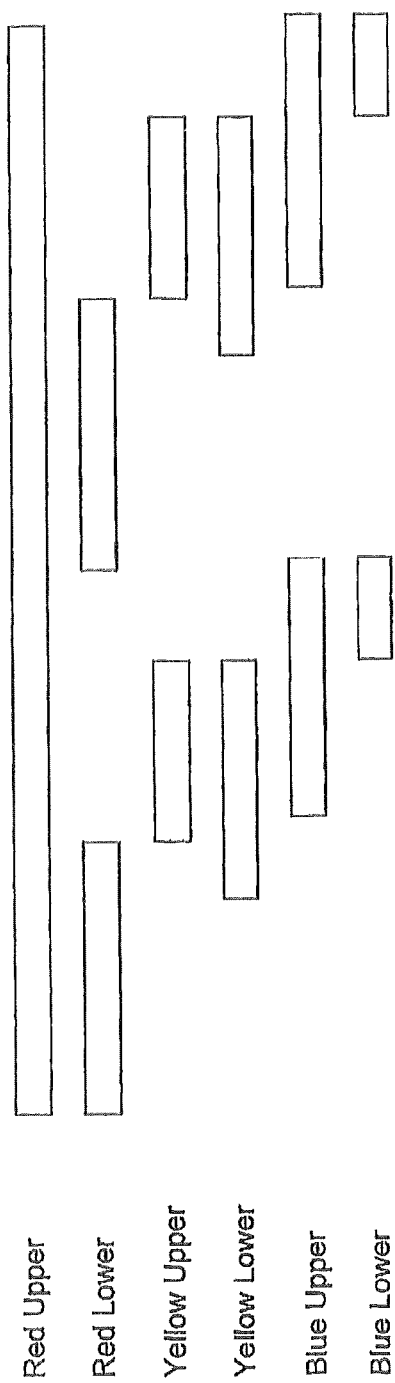
FIG. 7 illustrates the switching sequence of all switches during normal switching.

In the table of FIG. 4 some of the phase letters (R, Y, B) have a "dash" in front or after the letter. These dashes line up with the same letter, adjacent in the next mains 30-degree segment. These dashes signify how the transition from one segment to the next is achieved. For example consider the transition from segment number 1 to segment number 2—this transition is synchronised so that it can only occur when the yellow phase switch is turned on (signified by the Y-Y notation). The switching sequence is shown graphically with respect to the three phases in FIG. 6.

This resonant switching sequence results in sine-wave current flow through the transistors and output rectifier diodes, such that the current has almost returned to zero when each switching transition occurs. This reduces the switching losses in both the transistors and output diodes and allows for either MOSFET or IGBT switching transistors to be used. If IGBT transistors are used anti-parallel diodes may be employed to allow a reverse current path (emitter to collector).

FIG. 5 shows a logic table that signifies the function of each of the six transistors of the circuit shown in FIG. 2 during each of the 12 mains 30-degree segments where:

"L"—The transistor that is controlling the flow of current from the mains phase with the largest absolute voltage magnitude through to the resonant load, transformer, and ultimately the output of the rectifier.

"M"—The transistor that is controlling the flow of current from the mains phase with the medium absolute voltage magnitude through to the resonant load, transformer, and ultimately the output of the rectifier.

"S"—The transistor that is controlling the flow of current from the mains phase with the smallest absolute voltage magnitude through to the resonant load, transformer, and ultimately the output of the rectifier.

"on"—The transistor that is clamping the voltage created by the resonant load back to the mains phase with the largest absolute voltage magnitude. Note this transistor is turned on for the entire 30-degree mains segment.

"m"—The transistor that is clamping the voltage created by the resonant load back to the mains phase with the medium absolute voltage magnitude.

"s"—The transistor that is clamping the voltage created by the resonant load back to the mains phase with the smallest absolute voltage magnitude.

Upper case L, M and S indicate the switches that are switched so as to transfer power from supply lines 23 to 25 to the load whereas lower case on, m and s indicate the transistors that are switched to clamp the voltage spikes resulting from switching an inductive load. Over the 3rd segment for example (60° to 90°) with reference to FIGS. 2,5 and 6 the sequence is:

1. the upper red phase transistor 39 is switched on for the whole segment,
2. the lower red phase transistor 40 (L) is switched on, supplying current from red phase supply line 24 to transfer power to the load;
3. the lower yellow phase transistor 42 (*m*) is then switched on allowing diode 45 to clamp the voltage created by the resonant load back to the yellow phase voltage;
4. just after the lower red phase transistor (L) 40 is switched off the upper yellow phase transistor 41 (M) is switched on to connect yellow phase supply line 25 to transfer power to the load (this is soft resonant switching due to the voltage clamping in step 3 above);
5. shortly after upper yellow phase transistor 41(M) is switched on lower blue phase transistor 37 (*s*) is switched on to clamp the voltage created by the resonant load back to the blue phase voltage 6. shortly after upper and lower yellow phase transistors 41 and 42 are switched off lower blue phase transistor 35 (S) is switched on to connect the blue phase supply line 23 to the load.

This pattern repeats over each segment with the switching sequence changing for each sequence as shown in FIG. 5.

In order to achieve the correct mains input current PFC function the S switch on-time approaches a zero value each mains zero crossing as to obtain a correct PFC function the converter needs to be drawing zero current from the S mains phase at the mains voltage zero crossing.

Figure 8:
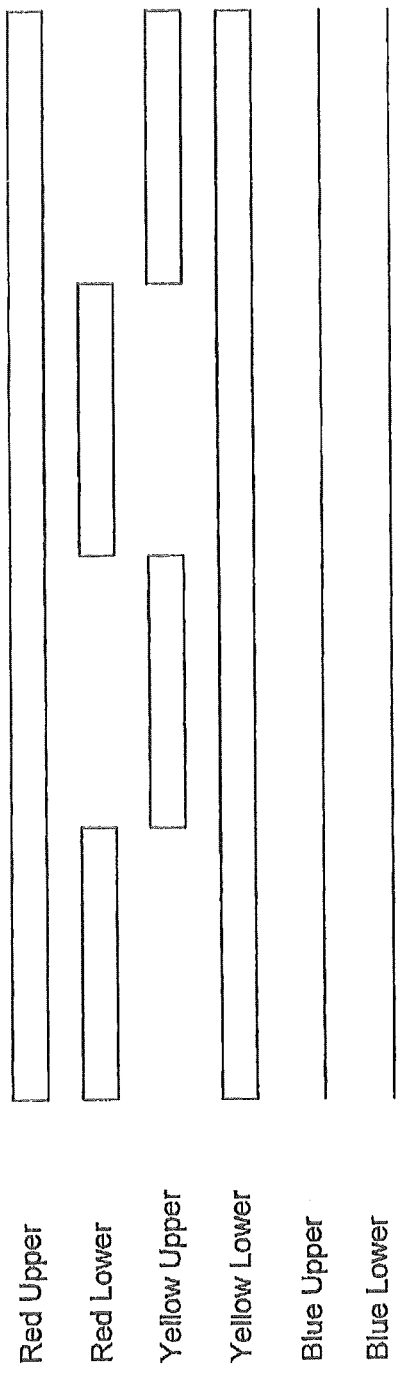
FIG. 8 illustrates the switching sequence of all switches near zero crossings.

Since it becomes impractical to try and turn a transistor on then off again in an extremely small time period, there comes a point (near each mains voltage zero crossing) were there is no point trying to turn the S transistor on. Hence for a period that starts a few degrees before each mains zero crossing and extends to a few degrees after the mains zero crossing the cyclo-converter may operate in a two-phase mode. This mode is referred to as a "zero-cross mode" and during this mode of operation the high frequency switching sequence is simply L, M, L, M, L, M, . . . —were only the L and M transistors are switched on and the S transistor remains off. During this "zero-cross mode" the transistor on-times for both the L and the M transistor are equal. From a PFC function point of view the mains L phase voltage and the mains M phase voltage are equal (but opposite polarity) at each mains zero voltage crossing, so equal (but opposite) currents need to be drawn from the L and M mains phases. Equal transistor on-times with equal phase voltages will lead to equal mains currents. The switching sequence for such "zero-cross mode" switching is shown in FIG. 8.

A different issue arises in maintaining the normal L, M, S, L, M, S, . . . high frequency switching sequence at the mains voltage magnitude crossing point. At every mains magnitude cross point the M and S phase voltages swap over and hence the definitions of M and S must also swap. If the rate of change of the mains phase voltages is considered with respect to the high frequency switching frequency of the cyclo-converter it becomes obvious that the concept of the M and S phase voltages crossing over at a particular instance in time is far from the reality. The rate of change of the mains phase voltages is so slow that for many high frequency switching cycles the M and the S phase voltages are effectively equal. What's more, when real world effects like noise are considered it can also be appreciated that the converter may actually operate for several high frequency switching cycles with incorrect M and S definitions. For example, the voltage on the phase we are calling S is actually greater (by a very small amount) than the voltage on the phase we are calling M. This error in the definition of the M and S phases causes the wrong transistor switching sequence which in turn leads to considerable current flowing from M to S mains phase (or S to M mains phase depending on relative voltage polarities. By changing the high frequency switching sequence used when the cyclo-converter is operating near to a mains voltage magnitude cross point this problem may be avoided.

Figure 9:
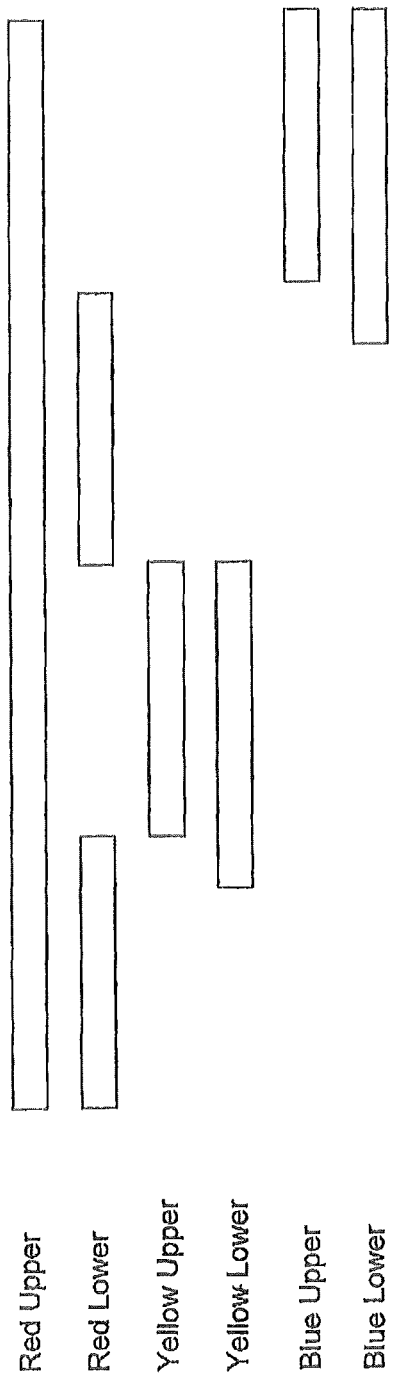
FIG. 9 illustrates the switching sequence of all switches near a magnitude crossing of phases.

For a period that starts a few degrees before each mains magnitude crossing and extends to a few degrees after the mains magnitude crossing the cyclo-converter may operate in an interleaved mode. This mode is referred to as a "magnitude-cross mode" and during this mode the high frequency switching sequence is simply L, M, L, S, L, M, L, S, . . . —were the M and S transistors are alternately switched on between each time the L transistor is switched on. During this "magnitude-cross mode" the transistor on-times for the L, M, and S transistors are all equal. From a PFC function point of view the mains L phase voltage is one polarity and the mains M and S phase voltages are equal to each other (but opposite polarity to the L phase) at each mains magnitude voltage crossing. The current drawn from the mains L phase needs to be returned in equal amounts to the mains M and S phases (e.g. 50:50) this interleaved switching sequence inherently achieves this result. The switching sequence for such "magnitude-cross mode" switching is shown in FIG. 9.

Thus the cyclo-converter uses three different high frequency switching sequences:

"zero-cross mode"—used near to mains phase zero crossings

"Three-phase mode"—the normal mode used the majority of the time

"magnitude-cross mode"—used near to mains phase magnitude crossings

During the zero-cross mode and the magnitude-cross mode the PFC function is inherent, but during the normal three-phase mode the correct "S/M Ratio" (i.e. the ratio of the time the small phase transistor is on to the ratio of time the medium phase transistor is on) is required to achieve a correct PFC function. The fact that the cyclo-converter achieves inherent PFC control at every mains voltage zero or magnitude cross point, then the mains phase input currents must be exactly correct for 12 points in every mains cycle. Consequently the mains input current PFC function is naturally good despite the "S/M Ratio" control values during the normal three-phase operational mode—hence the "S/M Ratio" can be thought of as a "fine trim" control that can improve the PFC function.

Figure 10:
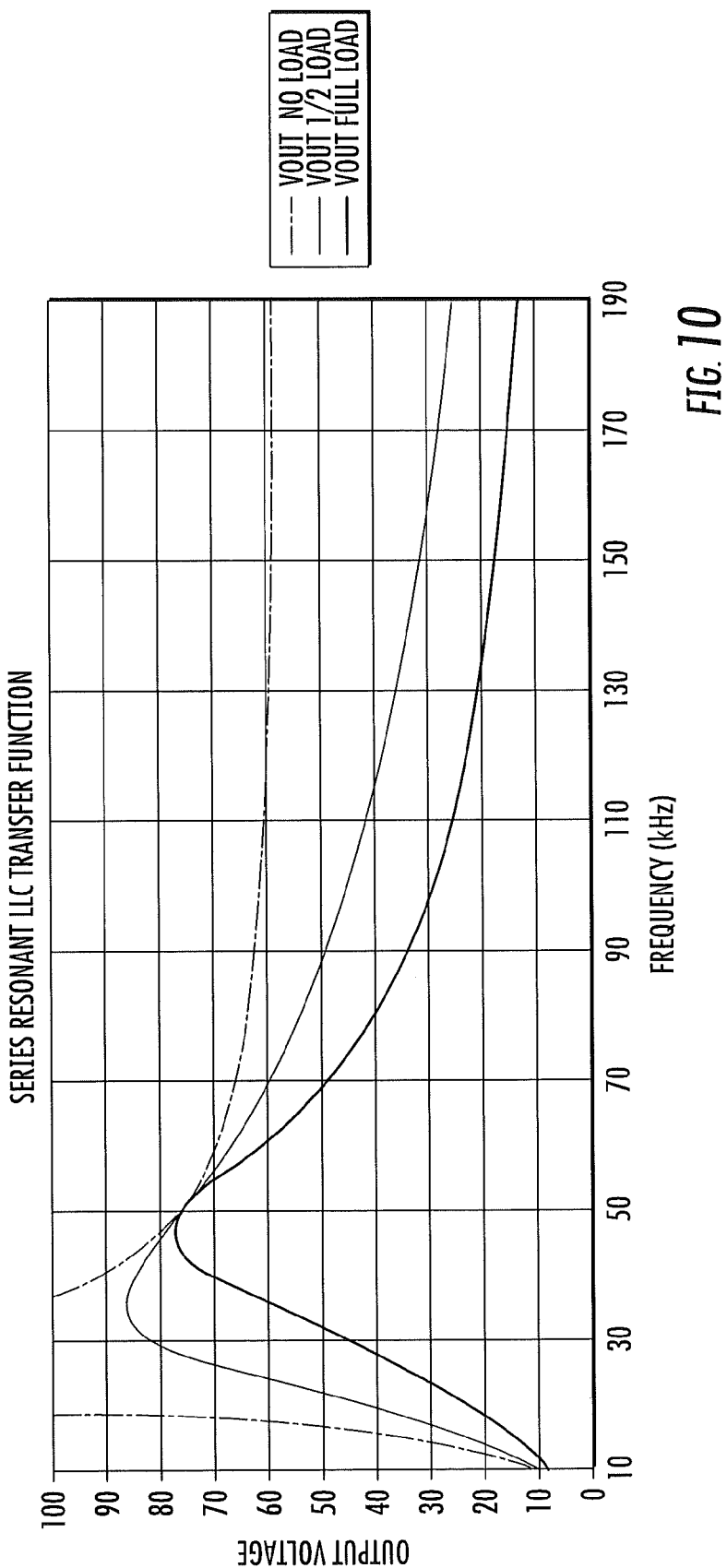
FIG. 10 shows a transfer function for the series resonant LLC circuit of the cyclo-converter shown in FIG. 2.

FIG. 10 shows the transfer function for the series-resonant LLC converter shown in FIG. 2. It can be seen that by varying the operational frequency that the converter is driven at that output voltage may be controlled. It can also be seen that as the converter is loaded up, the output voltage drops (for operation to the right of the peak of each curve). Thus, to maintain a constant output voltage, the operational frequency may be decreased as the output load is increased. Finally it can be seen that the output voltage does not significantly drop as the operational frequency is increased if the converter is lightly loaded. To regulate down the converter output down to achieve low output voltages when the converter is only lightly loaded a "pre-load" across the converter output that can be turned on when the converter is at light load or a discrete inductor may be provided across the transformer primary coil. [****]Another way of improving the no-load regulation ability of a LLC converter is to lower the shunt or magnetizing inductance of the main transformer by increasing the transformer gap. This eliminates the need to add an extra discrete component.

Output voltage control may thus be achieved by controlling the fundamental frequency that the resonant load is switched through the three instantaneous mains input phases voltage states. A voltage feedback loop may control this fundamental switching frequency, such that above resonance frequency is always maintained. Hence lowering the switching frequency increases the output voltage and increasing the switching frequency reduces the output voltage. Output current limiting may be achieved through an output voltage control loop by reducing the output set-point voltage to reduce or limit the output current.

This is a fundamentally different approach to the control of cyclo-converters which have traditionally been controlled by phase shifting the switching sequences of upper and lower switches to achieve PWM control. Whereas traditional cyclo-converters can utilise the "shorted" state to power down the converter pre-loading may be employed in the converter shown in FIG. 2.

Figure 11:
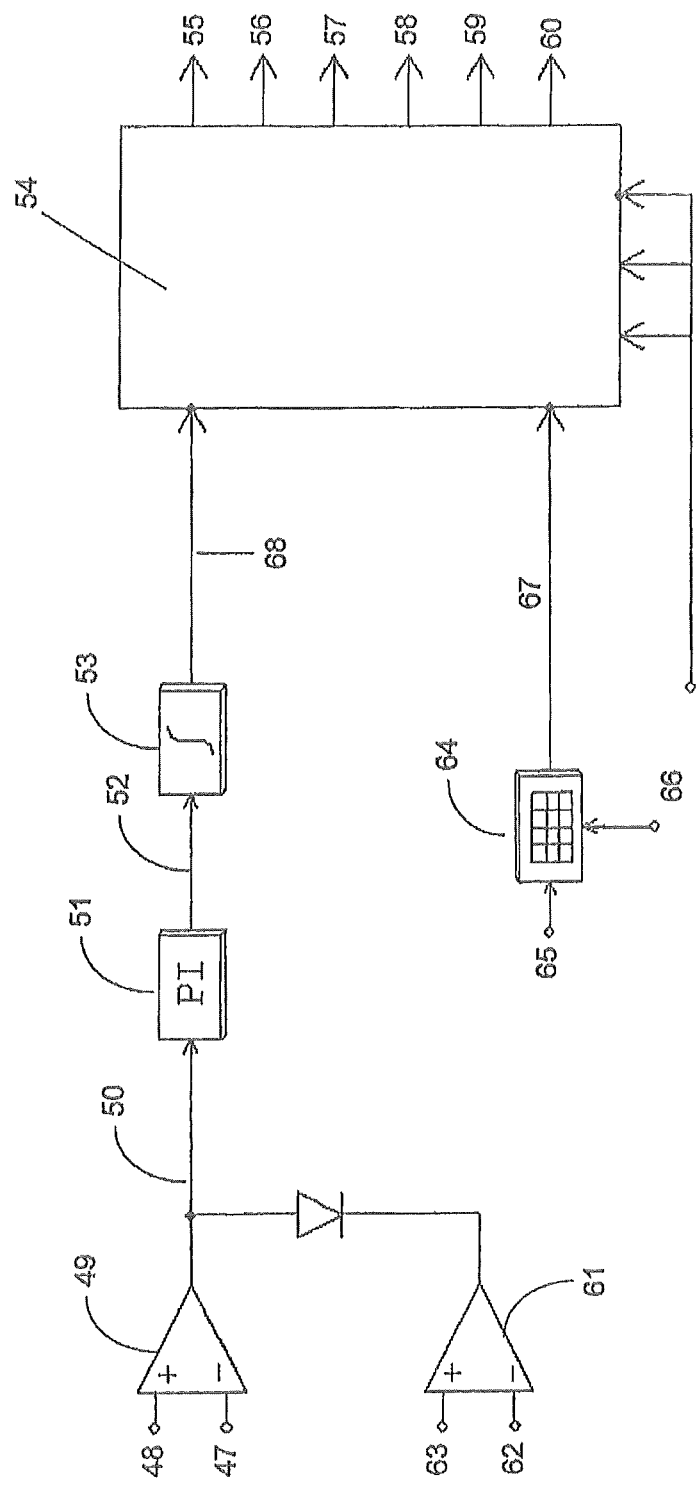
FIG. 11 shows a schematic diagram of a controller for controlling the cyclo-converter shown in FIG. 2.

FIG. 11 shows a schematic diagram of the control logic for the three-phase series-resonant half-bridge cyclo-converter shown in FIG. 2. This logic may be implemented in a combination of a Digital Signal Processor (DSP) and Programmable Logic Array (PLA) device or a number of other technologies. The main output voltage control loop is shown across the top of the diagram. The actual output voltage 47 is compared to a desired "set voltage" 48 by an error amplifier 49. The difference in the output voltage from the set voltage is expressed as an error signal 50 which is then used to drive the switching frequency of the cyclo-converter to achieve the fundamental variable frequency control as normally employed to control a conventional series-resonant LLC converter.

The error signal 50 is supplied to feedback transfer function block 51. The feedback transfer function block 51 allows the feedback response to be tuned to the characteristics of the converter in order to achieve minimum output voltage error, stable operation, and quick step response or settling time. Transfer function block 51 would typically contain individual proportional and integral feedback elements similar to any other power supply control loop.

The output 52 of the feedback transfer function block 51 feeds a control signal into a variable frequency oscillator 53 such that the "clock frequency" control signal that feeds the gate drive control logic 54 can effect the switching frequency of the cyclo-converter according to the output voltage feedback error signal 47 to drive the six power switches via drive signals 55 to 60.

Current amplifier 61 monitors the cyclo-converter's output current 62 and compares it to the output current limit 63. If the output current 62 is less than the output current limit 63 then the current amplifier 61 has no effect on the control of cyclo-converter. Should the output current 62 exceed the output current limit 61 then the current amplifier 61 will take over control of the primary (output voltage) control loop by pulling down error signal 50, thus reducing the output voltage in order to limit the output current to the current limit value.

Mains input Power Factor Correction (PFC) control may be achieved by varying the on time of each of the three mains input voltages. The output voltage feedback control loop sets the fundamental switching frequency—e.g. the total cycle time period. By increasing or decreasing the time that a particular transistor is switched on the current that is drawn from that particular phase can be controlled. Adjusting the proportions of time between the three phases will also adjust the voltage fed to the resonant load and hence the output voltage, but this effect is continually compensated by the output voltage control loop. Determining the specific required transistor on-times for each of the three input voltage states (to achieve PFC control) can be achieved either through characterising the requirements for all possible operating conditions or through an active control circuit that monitors the instantaneous individual mains currents then adjusts the respective transistor on-times to achieve the correct mains current draw. The instantaneous individual mains currents can be simply obtained by de-multiplexing the resonant load current into three components according to the current state of the switching transistors.

Preferably the phase having the largest absolute voltage (L) is switched on for a constant period, preferably about half the total switching period. The remaining portion is preferably divided between the phases having the middle absolute voltage (M) and the lowest absolute voltage (S). To effect PFC the DC output voltage and current 65 and three phase input voltages 66 may be input to a lookup table 64 to develop a control signal 67 "S/M Ratio" which is fed into the gate drive control logic block 54. The "S/M Ratio" control signal allows the ratio of the respective "Small" to "Medium" transistor on-times. Varying the "S/M Ratio" is the primary method of determining the respective current path for the return current drawn from the "Large" mains phase. If the "S/M Ratio" is set to zero (e.g. S=0) then all the current that is drawn from the "Large" mains phase is returned to the "Medium" mains phase. If the "S/M Ratio" is set to infinity (e.g. M=0) then all the current that is drawn from the "Large" mains phase is returned to the "Small" mains phase.

The values entered into the look-up table may be determined by operating the cyclo-converter at a specific operating condition and then tuning the table values to obtain the lowest mains current Total Harmonic Distortion (THD) or based on modelling. The "S/M Ratio" is varied throughout the 360 degree mains cycle, hence the mains current profile can be accurately manipulated (effectively each mains degree—or finer resolution if deemed necessary). By repeatable tuning the "S/M Ratio" values at different operational conditions the look-up table can allow for the entire operational spectrum for the cyclo-converter to be mapped out. The use of this look-up table avoids the need to actually monitor the input mains currents in production built cyclo-converters, hence simplifying the implementation of control hardware.

The "gate drive control logic" 54 has three fundamental inputs:

Clock Frequency 68—primary parameter for output voltage control

S/M Ratio 67—primary parameter for mains input current THD control

Mains Input Voltage 66 (×3)—used to determine "Mains Angle"

Combinational and sequential logic implemented within a Programmable Logic Array (PLA) may use the "Mains Angle" information to determine the individual phase voltage magnitudes and polarities and accordingly determines which transistors should be driven with which of the six control signals: "L", "M", "S", "on", "m", & "s". The "Clock Frequency" 68 & "S/M Ratio" 67 control signals are combined with the "Mains Angle" 66 information to determine the specific high frequency drive signal for each of the six main transistors.

Determining the specific required transistor on-times for each of the three input voltage states (to achieve PFC control) can also be achieved by an active control circuit that monitors the instantaneous individual mains currents and then adjusts the respective transistor on-times to achieve the correct mains current draw. The instantaneous individual mains currents can be obtained by de-multiplexing the resonant load current into three components according to the current state of the switching transistors.

Figure 12:
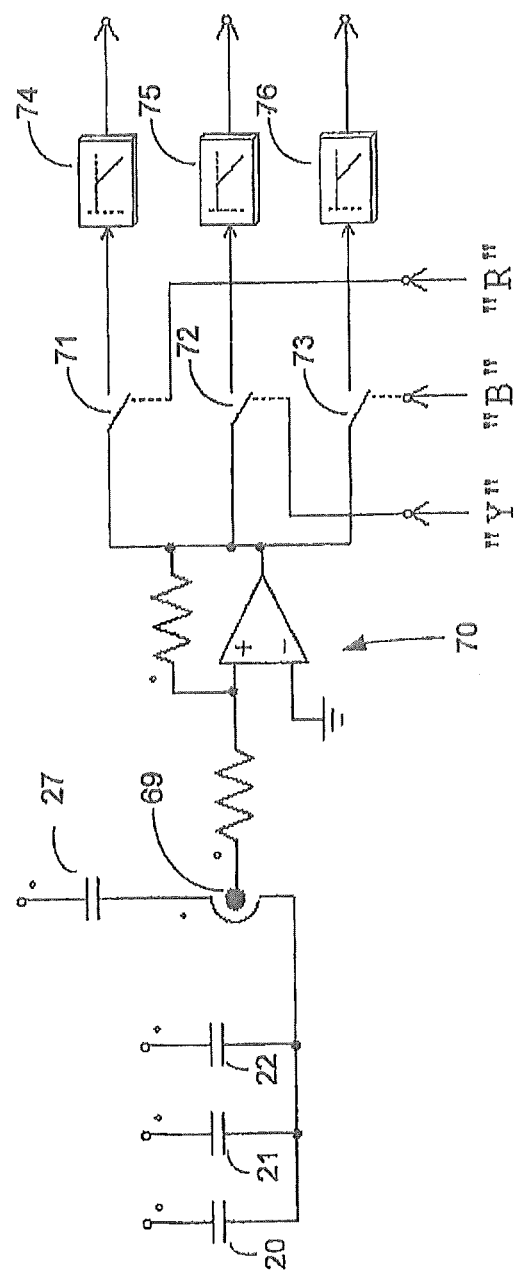
FIG. 12 shows an alternative current feedback control circuit.

The current de-multiplexer circuit of FIG. 12 shows how the three individual mains currents can be extracted from the cyclo-converter main transformer primary current. The current sensor 69 and amplifier 70 monitors the cyclo-converter main transformer primary current. The three de-multiplexer switches 71, 72 and 73 are closed (one at a time) according to which of the three mains AC switches (back-to-back transistors) is conducting current in the cyclo-converter. The de-multiplexed signal is then low pass filtered by filters 74, 75 and 76 to remove the high frequency switching noise, resulting in three unique signals that represent the cyclo-converter mains input currents. This circuit could be used to implement mains input current THD control from a feedback driven control loop instead of using the look-up table concept described above. Alternatively three individual mains current sensors could be used instead of this de-multiplexer circuit to achieve the same result.

FIGS. 13 to 16 show possible bidirectional switches that may be used in the cyclo-converter shown in FIG. 2

FIG. 13 shows a switch consisting of two back-to-back MOSFET transistors 77 and 78. One MOSFET blocks the forward current and the other blocks the reverse current path. The body diodes 79 and 80 of each MOSFET provides a current path for the other MOSFET.

FIG. 14 shows a switch consisting of two back-to-back IGBT transistors 81 and 82. Since IGBT devices do not exhibit an inherent body diode a separate discrete diode 83, 84 referred to as an "anti-parallel" diode is connected across the emitter and collector terminals of the transistor. This anti-parallel diode serves the same function in the AC switch as the body diode in the MOSFET AC switch.

FIG. 15 shows a switch consisting of two MOSFET transistors 85 and 86 but uses two extra discrete diodes 87 and 88 in order to deactivate the body diode of the MOSFET. This circuit can be used to allow the use of MOSFET transistors that exhibit extremely slow performance from the body diode. The discrete diodes would typically be an ultra-fast device and this AC switch will exhibit a diode recovery time that is determined by the discrete diodes performance (as opposed to the MOSFET body diode recovery performance).

FIG. 16 shows a switch employing a back-to-back combination of both MOSFETs 89 and 90 and IGBT devices 91 and 92. This combination can deliver the best characteristics of both devices. This combination can provide the low conduction losses that IGBT transistors provide and the low switching losses that MOSFET transistors provide.

Any of the switches shown in FIGS. 13 to 16 could be used in the three-phase series-resonant half-bridge cyclo-converter shown in FIG. 2. The options offer differences in cost and performance.

Figure 17:
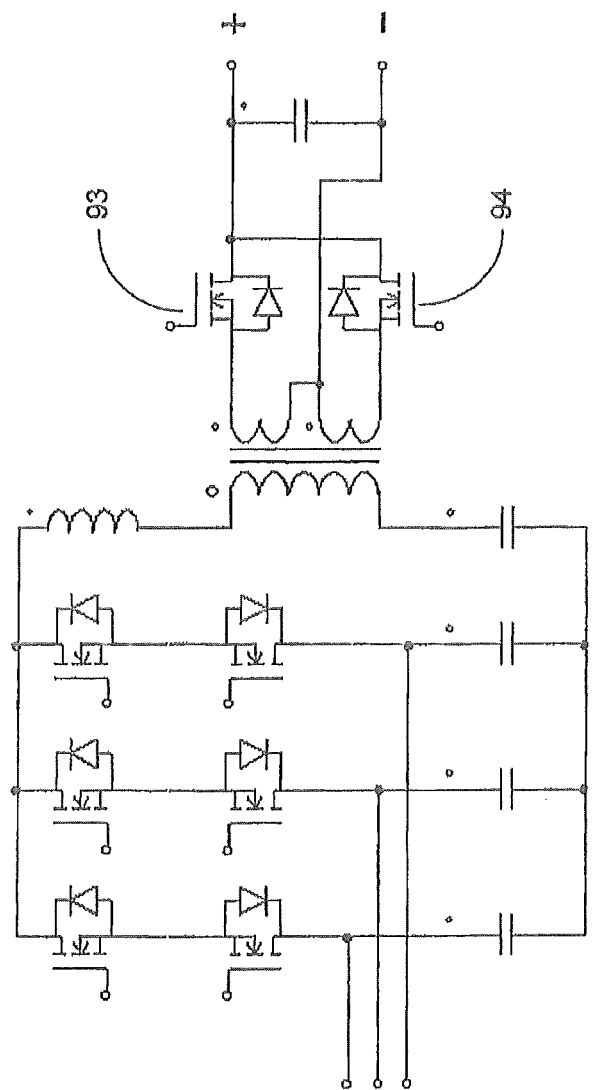
FIG. 17 shows a bidirectional half bridge cyclo-converter.

FIG. 17 shows a variant of the cyclo-converter shown in FIG. 2 in which MOSFETs 93 and 94 replace diodes 32 and 33 to provide synchronous rectification. MOSFETs 93 and 94 include inherent body diodes shown in parallel with each MOSFET. The application of synchronous rectification may increase the overall conversion efficiency from 96% to 97% (400V AC input 48 V DC output)—i.e. a reduction of total conversion losses of 25% or in other words a reduction in output rectification losses of 50%. This level of efficiency gain can justify the extra cost and control complexity of changing from diode to synchronous rectification for the output devices.

A by-product of changing the output diodes to controlled MOSFET devices to achieve synchronous rectification is that the converter becomes bi-directional (for energy flow). With appropriate control this three-phase AC to DC converter (rectifier) can be used to perform the function of a DC to three-phase AC converter (inverter). This will allow the converter to be used in UPS type applications.

There is thus provided a single stage frequency controlled full resonant converter including power factor correction. The control approach is quite different to prior art approaches in which the switching of upper and lower switches is shifted to short the load to power down the converter. The above converter utilises switching frequency control via a feedback loop to control converter output and adjustment of phase on times to provide power factor correction. With full resonant operation lower rated semiconductor components may be used.

The converter provides a simple power component design with a greatly reduced power component count. The single stage configuration provides high conversion efficiency and simplifies the design. The design also avoids the need for large energy storage devices or large output inductors due to the comparatively high switching frequency. The DC output is fully isolated from the input source. Output voltage control (via switching frequency) is isolated from PFC by adjusting the on times for each phase. The converter also achieves low total harmonic distortion. The converter may be used over a wide range of input voltages and can supply a wide range of output voltages.

Figure 18:
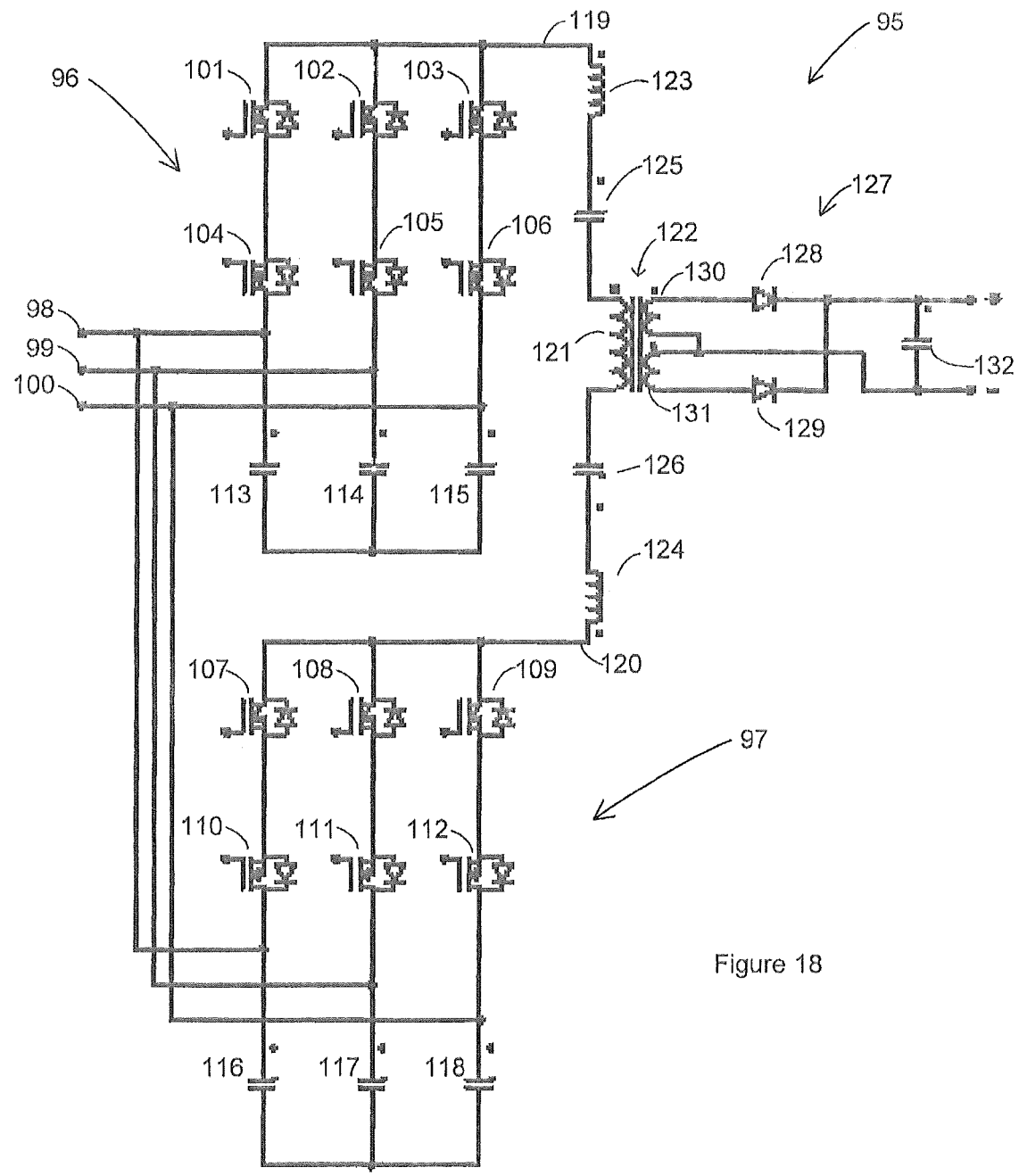
FIG. 18 shows a three phase switched-mode cyclo-converter employing resonant switching including first and second half bridge cyclo-converters.

Referring now to FIG. 18 a switched-mode full bridge cyclo-converter embodiment is shown. The cyclo-converter 95 includes a first half bridge cyclo-converter 96 and a second half bridge cyclo-converter 97 of similar topology to the cyclo-converter shown in FIG. 2. Lines 98, 99 and 100 supply a three phase voltage supply to each half bridge cyclo-converter 96 and 97. First half bridge cyclo-converter 96 includes bidirectional switches 101 to 106 as per the embodiment shown in FIG. 2. Second half bridge cyclo-converter 97 also includes bidirectional switches 107 to 112 as per the embodiment shown in FIG. 2.

First half bridge cyclo-converter 96 also includes capacitors 113 to 115 connected in a star configuration to the bidirectional switches 104 to 106 with the three phase supply voltages supplied between the bidirectional switches 104 to 106 and capacitors 113 to 115. Second half bridge cyclo-converter 97 includes capacitors 116 to 118 connected in a star configuration to the bidirectional switches 110 to 112 with the three phase supply voltages supplied between the bidirectional switches 110 to 112 and capacitors 116 to 118. In this case the capacitors 116 to 118 and 113 to 115 are interconnected at virtual neutral points rather than to the output transformer as in the previous embodiment. The star networks of capacitors clamp voltage spikes resulting from switching the current of the bidirectional switches.

The output lines 119 and 120 from each half bridge cyclo-converter 96 and 97 are supplied to either terminal of primary coil 121 of output transformer 122. Additional capacitive and/or inductive elements may be provided to form a resonant circuit. In this embodiment inductive elements 123 and 124 and capacitive elements 125 and 126 are provided on either side of primary coil 121 as this symmetrical arrangement has been found provide greater stability and reduce ringing at high frequencies.

In this embodiment a passive rectifier 127 formed by diodes 128 and 129 is connected to the secondary coils 130 and 131 of output transformer 122. Capacitor 132 smooths the DC output. It will be appreciated that the passive rectifier may be replaced with a synchronous rectifier as in previous embodiments.

It will be appreciated that this arrangement effectively doubles the apparent voltage applied across the primary coil 121 of the output transformer 122 and thus proportionally reduces the high frequency current through the switches and passive components. This can halve the component ratings or double the converter power capacity. Other advantages of this topology will become apparent from the following description of the various modes of operation.

Figure 21:
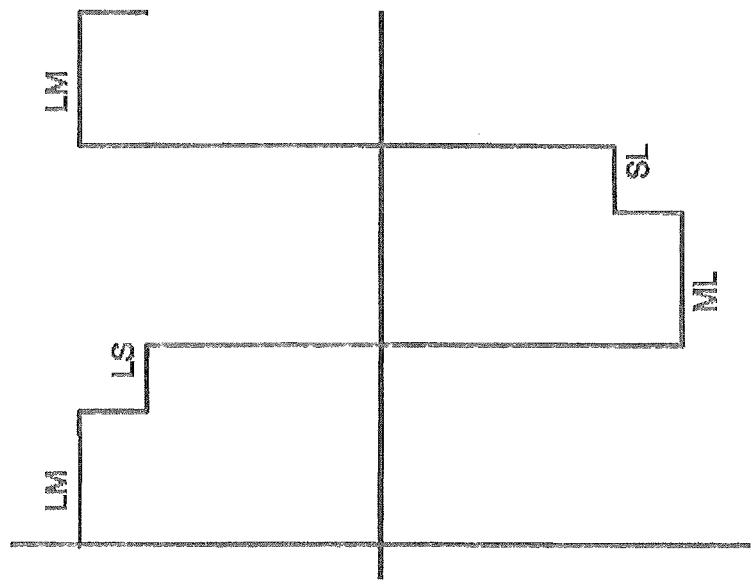
FIG. 21 shows a resultant output switching sequence when combining the waveforms shown in FIGS. 19 and 20.
Figure 19:
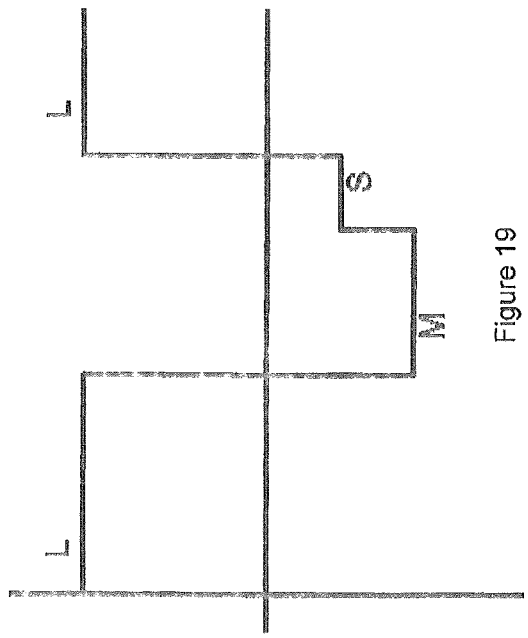
FIG. 19 shows a switching sequence Of one half bridge of the cyclo-converter as shown in FIG. 18.
Figure 20:
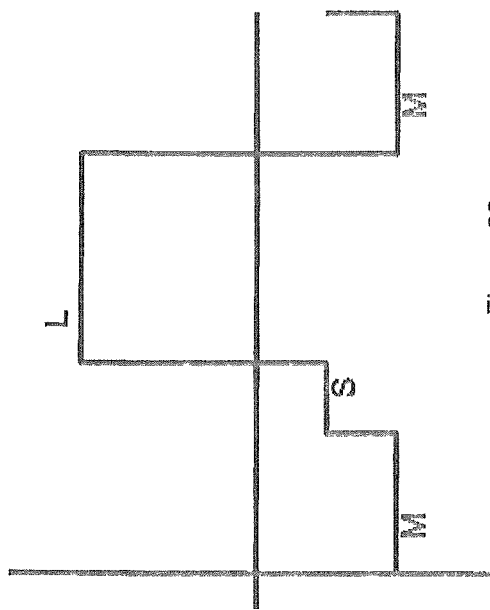
FIG. 20 shows a switching sequence of the other half bridge of the cyclo-converter as shown in FIG. 18.

Referring to FIGS. 19 to 21 one mode of operation of the converter shown in FIG. 18 will be described. The detailed operation of each converter will be understood by reference to the detailed description of a half bridge converter given in relation to the first half bridge embodiment. FIG. 19 shows a switching sequence for the largest (L), medium (M) and smallest (S) absolute voltages of the three phase input lines for the first half bridge converter 96 and FIG. 20 shows a switching sequence for the largest (L), medium (M) and smallest (S) absolute voltages of the three phase input lines for the second half bridge converter 97. In this mode the largest absolute voltage L for each half bridge converter may be switched on for 50% of the time and the M and S for the remainder of the time. Thus one half bridge is driven 180 degrees out of phase with respect to the other half bridge.

It will be noted that the L sections for one half bridge correspond with the M and S sections for the other half bridge. Thus the sequence for one half bridge is delayed by half a switching cycle after the other. This results in the symmetric total switching sequence shown in FIG. 21 that combines FIGS. 19 and 20. This inherent symmetry and balance simplifies the control of the converter as a 50% duty cycle may be used instead of having to dynamically adjust the ratio of L to M and S to prevent applying a DC (or low frequency) voltage to the tank. In this way all of the requirements for phase sequence in and out of magnitude crossing and zero crossing modes and the gate level switching sequence for each half bridge are the same and satisfied using the original control described in relation to the half bridge cyclo-converter of FIG. 2.

Figure 24:
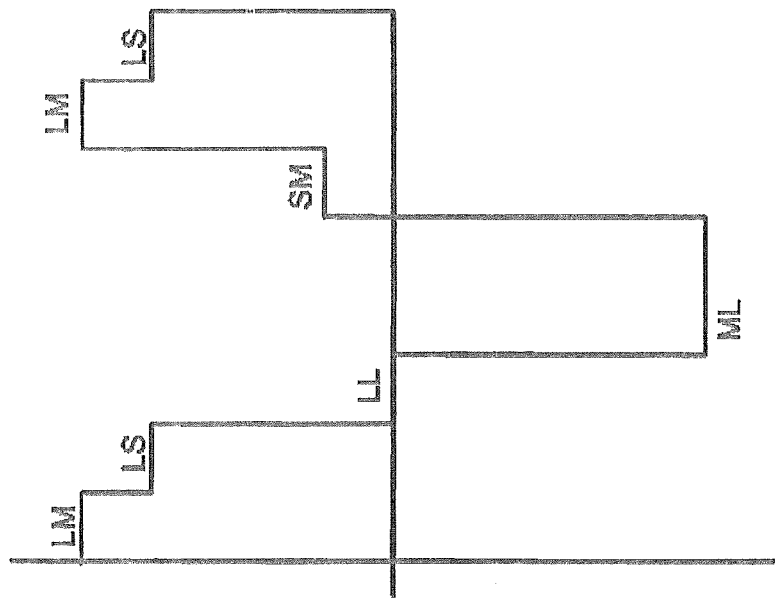
FIG. 24 shows a resultant output switching sequence when combining the waveforms shown in FIGS. 22 and 23.
Figure 22:
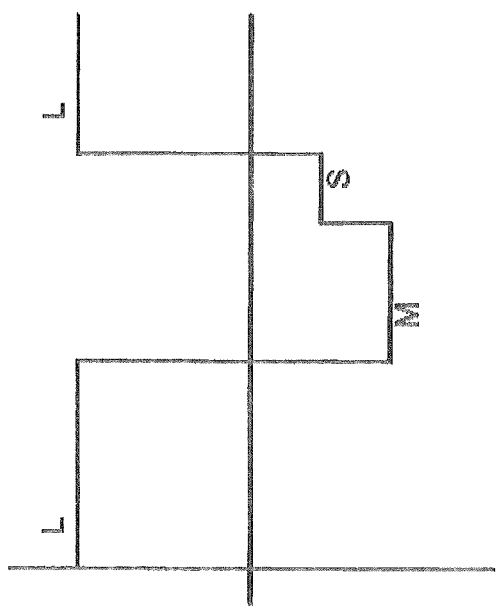
FIG. 22 shows a switching sequence of one half bridge of the cyclo-converter as shown in FIG. 18 in another mode of operation.
Figure 23:
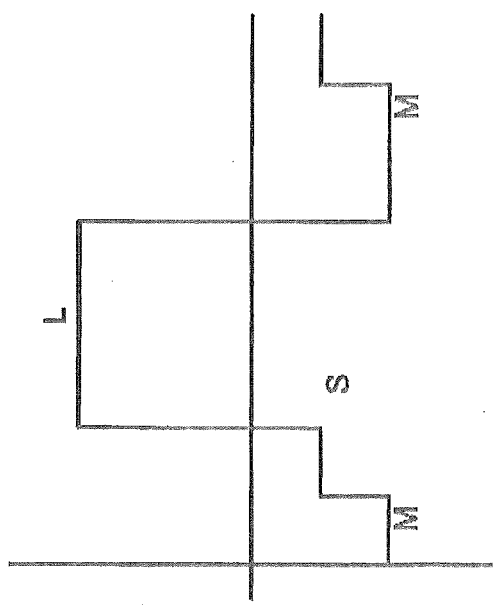
FIG. 23 shows a switching sequence of the other half bridge of the cyclo-converter as shown in FIG. 18 for the mode of operation shown in FIG. 22.

Referring now to FIGS. 22 to 24 a switching strategy for driving the half bridges during light load conditions will be described. FIG. 22 shows a switching sequence for the largest (L), medium (M) and smallest (S) absolute voltages of the three phase input lines for the first half bridge converter 96 and FIG. 23 shows a switching sequence for the largest (L), medium (M) and smallest (S) absolute voltages of the three phase input lines for the second half bridge converter 97. In this case the switching sequence for half bridge converter 97 is delayed by other that 50% of the duty cycle (in this case less than 50%). In this mode the resultant switching sequence shown in FIG. 24 is seen to be closer to a sine wave and reduces the power supplied to the output of the converter 95. Thus phase shifting the switching sequences of the first and second half bridge converters 96 and 97 may be used as a way to control the power output of the converter 95 with the benefit of a more sinusoidal output waveform.

LLC converters have a natural problem with light load operation, since the input voltage tends to be fixed and the transfer function is such that the controlling parameter (Fs) has to move very far from its nominal point to control its output at very light loads. With the full bridge cyclo-converter shown in FIG. 18 other options may be used as described below.

Figure 25:
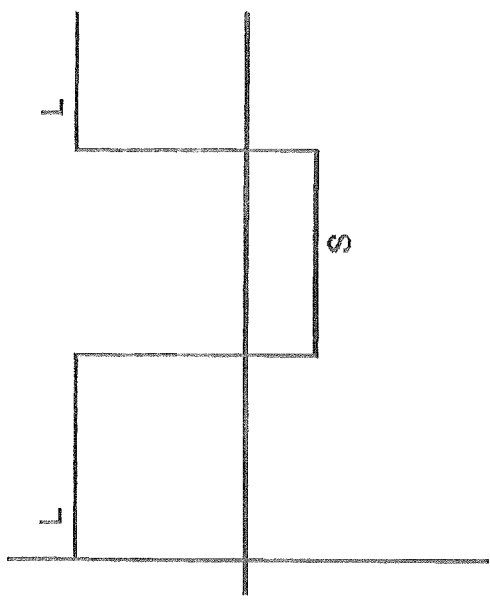
FIG. 25 shows a switching sequence of one half bridge of the cyclo-converter as shown in FIG. 18 in another mode of operation.
Figure 26:
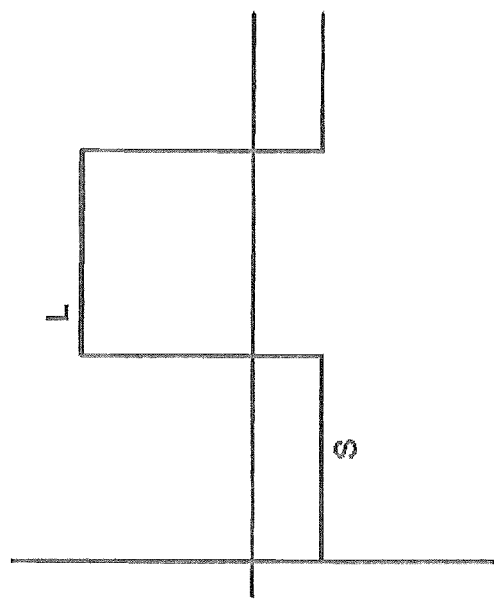
FIG. 26 shows a switching sequence of the other half bridge of the cyclo-converter as shown in FIG. 18 for the mode of operation shown in FIG. 25.
Figure 27:
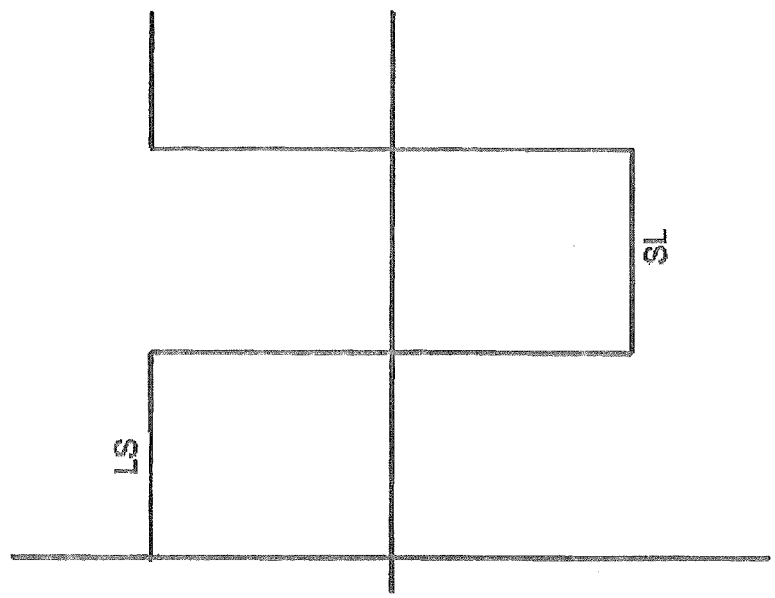
FIG. 27 shows a resultant output switching sequence when combining the waveforms shown in FIGS. 25 and 26.

FIGS. 25 to 27 illustrate a strategy where each half bridge converter 96 and 97 switches only between L and S (with M ignored). Thus half bridge converter 96 may switch between L and S as shown in FIG. 25 and half bridge converter 97 may switch between L and S as shown in FIG. 26 resulting in a cumulative square wave output as shown in FIG. 27. Due to the replacement of M with S the applied voltage to output transformer 122 will be lower and thus the output of the converter reduced.

Figure 30:
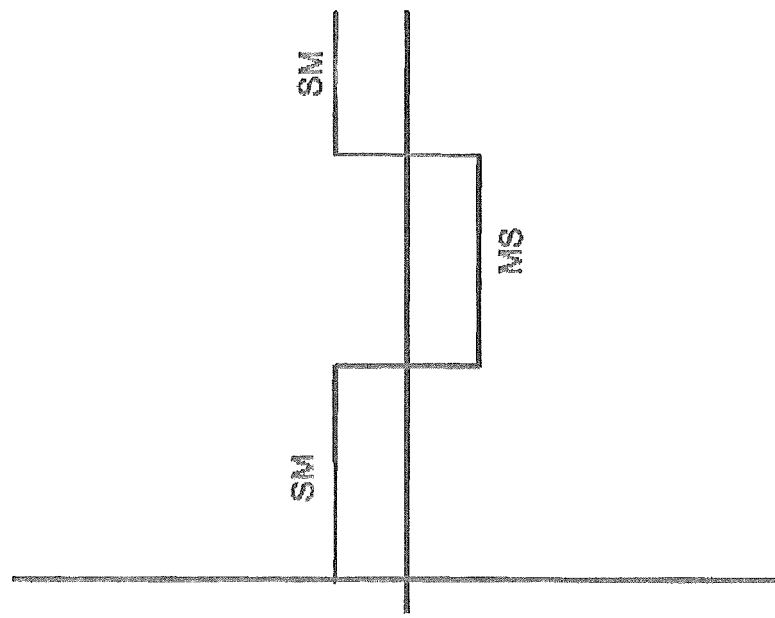
FIG. 30 shows a resultant output switching sequence when combining the waveforms shown in FIGS. 28 and 29.
Figure 28:
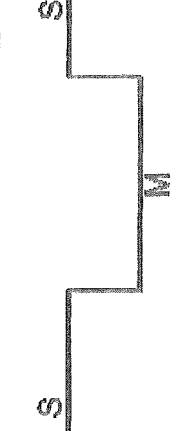
FIG. 28 shows a switching sequence of one half bridge of the cyclo-converter as shown in FIG. 18 in another mode of operation.
Figure 29:
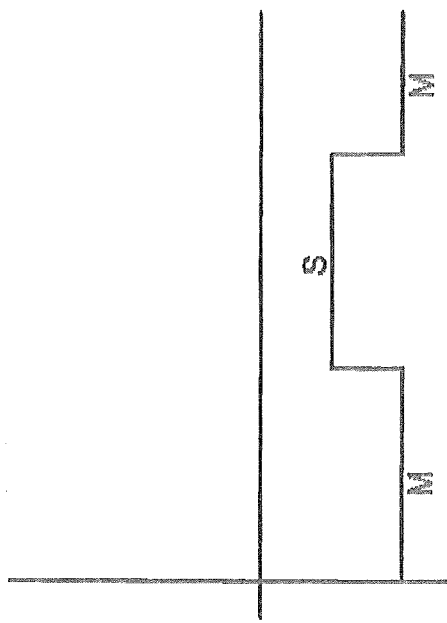
FIG. 29 shows a switching sequence of the other half bridge of the cyclo-converter as shown in FIG. 18 for the mode of operation shown in FIG. 28.

FIGS. 28 to 30 show a more extreme strategy in which L is omitted and switching alternates between S and M only resulting in the square wave switching sequence shown in FIG. 30 in which the applied voltage to output transformer 122 will be even lower than with the previous strategy and thus the output of the converter will be reduced even further.

Figure 31:
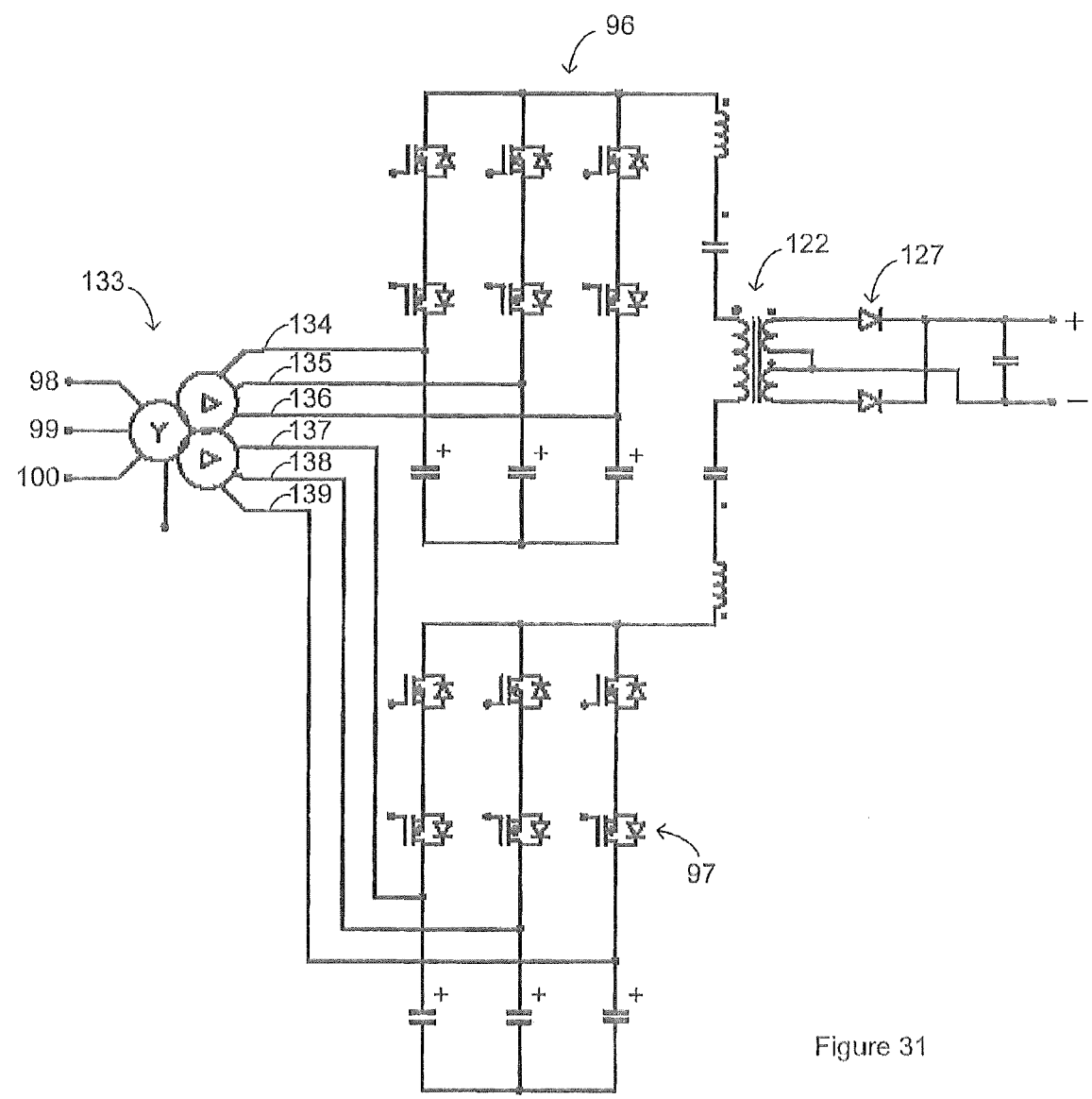
FIG. 31 shows a modified version of the three phase switched-mode cyclo-converter shown in FIG. 18 including a phase shifting transformer.

By supplying both half bridge converters 96 and 97 with in phase input voltages there will be a ripple in the output voltage of the converter 95 at a frequency Fr. To reduce the magnitude of the output voltage ripple and increase its frequency FIG. 31 shows a modification to the circuit of FIG. 18 in which a phase shifting transformer 133 phase shifts the three phase voltages 137 to 139 supplied to half bridge converter 97 by 60 degrees with respect to the three phase voltages 134 to 136 supplied to half bridge converter 96. This reduces the magnitude of the output voltage ripple and doubles its frequency to 2 Fr.

While the present invention has been illustrated by the description of the embodiments thereof, and while the embodiments have been described in detail, it is not the intention to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

What is claimed is:

1. A switched-mode cyclo-converter employing resonant switching comprising:
   i. a first half bridge cyclo-converter including:
      i. three phase voltage inputs;
      ii. bidirectional switches between each input and an output line; and
      iii. capacitors between each input and a common node;
   ii. a second half bridge cyclo-converter including:
      i. three phase voltage inputs;
      ii. bidirectional switches between each input and an output line; and
      iii. capacitors between each input and a common node;
   iii. a series LLC resonant circuit connected across the output lines of the first and second half bridge cyclo-converters; and
   iv. a controller that controls the switching periods of the bidirectional switches based on the three phase voltages;
      wherein each of the bidirectional switches in the first half bridge cyclo-converter is configured to support four switching states including: full-on, full-off, forward-direction conducting diode and reverse-direction conducting diode.

2. A switched-mode cyclo-converter as claimed in claim 1 wherein the series LLC resonant circuit includes a primary coil of an output transformer as th center "L" in the series LLC resonant circuit.

3. A switched-mode cyclo-converter as claimed in claim 2 wherein the series LLC resonant circuit includes an additional inductive element as the first "L" in the series LLC resonant circuit.

4. A switched-mode cyclo-converter as claimed in claim 1 including a power supply transformer which supplies three phase input voltages to the three phase voltage inputs of the half bridge cyclo-converters.

5. A switched-mode cyclo-converter as claimed in claim 4 wherein the power supply transformer is a phase shifting transformer supplying first phase shifted three phase voltage inputs to one of the half bridge cyclo-converters and further supplying second phase shifted three phase voltage inputs to the other one of the half bridge cyclo-converters; and wherein each of the first phase shifted three phase voltage inputs is 60 degrees out-of-phase relative to a corresponding one of the second phase shifted three phase voltage inputs.

6. A switched-mode cyclo-converter as claimed in claim 1 including an output rectifier.

7. A switched-mode cyclo-converter as claimed in claim 6 wherein the output rectifier includes bidirectional switching elements enabling the converter to function as an inverter.

8. A switched-mode cyclo-converter as claimed in claim 1 wherein the controller controls the switching frequency of the bidirectional switches in dependence upon the output voltage of the cyclo-converter.

9. A switched-mode cyclo-converter as claimed in claim 1 wherein the switching frequency is controlled in dependence on a resonant transfer function for the resonant components.

10. A switched-mode cyclo-converter as claimed in claim 1 wherein elements of the bidirectional switches are pre-switched by the controller to ensure soft switching.

11. A switched-mode cyclo-converter, comprising:
a first half-bridge cyclo-converter containing first, second and third pairs of switches therein with each of the three pair of switches supporting four switching states including: full-on, full-off, forward-direction conducting diode and reverse-direction conducting diode;
a second half-bridge cyclo-converter containing first, second and third pairs of switches therein with each of the three pair of switches supporting four switching states including: full-on, full-off, forward-direction conducting diode and reverse-direction conducting diode;
a first plurality of capacitors having respective first terminals electrically connected to corresponding first, second and third input terminals of said first half-bridge cyclo-converter;
a second plurality of capacitors having respective first terminals electrically connected to corresponding first, second and third input terminals of said second half-bridge cyclo-converter; and
a resonant circuit having a first terminal electrically connected to an output terminal of said first half-bridge cyclo-converters and a second terminal electrically connected to an output terminal of said second half-bridge cyclo-converter, said resonant circuit comprising a series combination of at least a first inductor, a primary coil of a transformer and a first capacitor.

12. The switched-mode cyclo-converter of claim 11, wherein said resonant circuit comprises a series combination of first and second inductors, the primary coil of the transformer and first and second capacitors.

13. The switched-mode cyclo-converter of claim 12, wherein the first terminal of said resonant circuit is a current carrying terminal of the first inductor and the second terminal of said resonant circuit is a current carrying terminal of the second inductor.

14. The switched-mode cyclo-converter of claim 13, wherein the primary coil of the transformer has a first terminal electrically connected to a terminal of the first capacitor and a second terminal electrically connected to a terminal of the second capacitor.

15. The switched-mode cyclo-converter of claim 12, wherein said resonant circuit is a series LCLCL circuit with the primary coil of the transformer extending between the LC and CL portions of the series LCLCL circuit.

16. The switched-mode cyclo-converter of claim 11, further comprising a phase shifting transformer responsive to three AC voltage signals that are 120 degrees out-of-phase relative to each other, said phase shifting transformer configured to supply the first, second and third input terminals of said first half-bridge cyclo-converter with three AC voltage signals that are 120 degrees out-of-phase relative to each other and supply the first, second and third input terminals of said second half-bridge cyclo-converter with three AC voltage signals that are 120 degrees out-of-phase relative to each other and 60 degrees out-of-phase relative to the three AC voltage signals supplied to the first, second and third input terminals of said first half-bridge cyclo-converter.

* * * * *

UNITED STATES PATENT AND TRADEMARK OFFICE
CERTIFICATE OF CORRECTION

Page 1 of 1

PATENT NO. : 9,219,407 B2
APPLICATION NO. : 13/532205
DATED : December 22, 2015
INVENTOR(S) : Harrison et al.

It is certified that error appears in the above-identified patent and that said Letters Patent is hereby corrected as shown below:

In the Specification:
Column 4, Line 29: Please correct "sequence Of one"
                              to read -- sequence of one --

In the Claims:
Column 14, Claim 2, Line 44: Please correct "as th center"
                              to read -- as the center --

Signed and Sealed this
Twenty-eighth Day of June, 2016

Michelle K. Lee
*Director of the United States Patent and Trademark Office*